United States Patent
Thomas et al.

(10) Patent No.: US 11,739,594 B2
(45) Date of Patent: Aug. 29, 2023

(54) TESTING AND VALIDATION OF CONNECTORS FOR SUBSEA INTERVENTION RISER SYSTEMS

(71) Applicant: Chevron U.S.A. Inc., San Ramon, CA (US)

(72) Inventors: Timothy Douglas Thomas, Houston, TX (US); Jeffrey Paul Goetz, Houston, TX (US); Raymond Anthony Stawaisz, Tomball, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 399 days.

(21) Appl. No.: 17/149,971

(22) Filed: Jan. 15, 2021

(65) Prior Publication Data
US 2021/0293095 A1    Sep. 23, 2021

Related U.S. Application Data

(60) Provisional application No. 62/990,662, filed on Mar. 17, 2020.

(51) Int. Cl.
| | | |
|---|---|---|
| *E21B 17/042* | (2006.01) | |
| *F16L 15/00* | (2006.01) | |
| *G01N 3/18* | (2006.01) | |
| *G01N 3/20* | (2006.01) | |

(52) U.S. Cl.
CPC .......... *E21B 17/042* (2013.01); *F16L 15/004* (2013.01); *G01N 3/18* (2013.01); *G01N 3/20* (2013.01)

(58) Field of Classification Search
CPC ........ E21B 43/106; E21B 17/00; E21B 17/06; E21B 47/01; E21B 17/085; E21B 33/064; E21B 7/124; E21B 17/043; E21B 33/06; E21B 17/0423; E21B 17/0426; E21B 17/042; E21B 17/01; E21B 19/166; F16L 15/00; F16L 15/001; F16L 15/004; F16L 15/003; F16L 23/10; F16B 37/145
See application file for complete search history.

(56) References Cited

U.S. PATENT DOCUMENTS

| | | | | |
|---|---|---|---|---|
| 4,838,068 | A * | 6/1989 | Carlin ................... | F16L 15/009 72/340 |
| 2006/0145480 | A1 * | 7/2006 | Mallis ................... | F16L 15/004 285/390 |
| 2016/0123507 | A1 * | 5/2016 | Spears ................... | F16L 47/16 29/428 |
| 2018/0051836 | A1 * | 2/2018 | Wajnikonis ........... | F16L 15/002 |

OTHER PUBLICATIONS

American Petroleum Institute, Procedures for Testing Casing and Tubing Connections, API Recommended Practice 5C5, Fourth Edition, Jan. 2017, 210 pages.
American Petroleum Institute, Design and Manufacture of Subsea Well Intervention, API Standard 17G, Third Edition, Nov. 2019, 280 pages.

* cited by examiner

*Primary Examiner* — Brandi N Hopkins
(74) *Attorney, Agent, or Firm* — King & Spalding LLP

(57) ABSTRACT

The disclosure is related to methods for testing and/or validating drill pipe and threaded and coupled connectors for use in subsea intervention system riser applications (open-water and through-riser). The methods are novel applications for testing and/or validating drill pipe and threaded and coupled connections that conform to Annex E of API 17G.

19 Claims, 7 Drawing Sheets

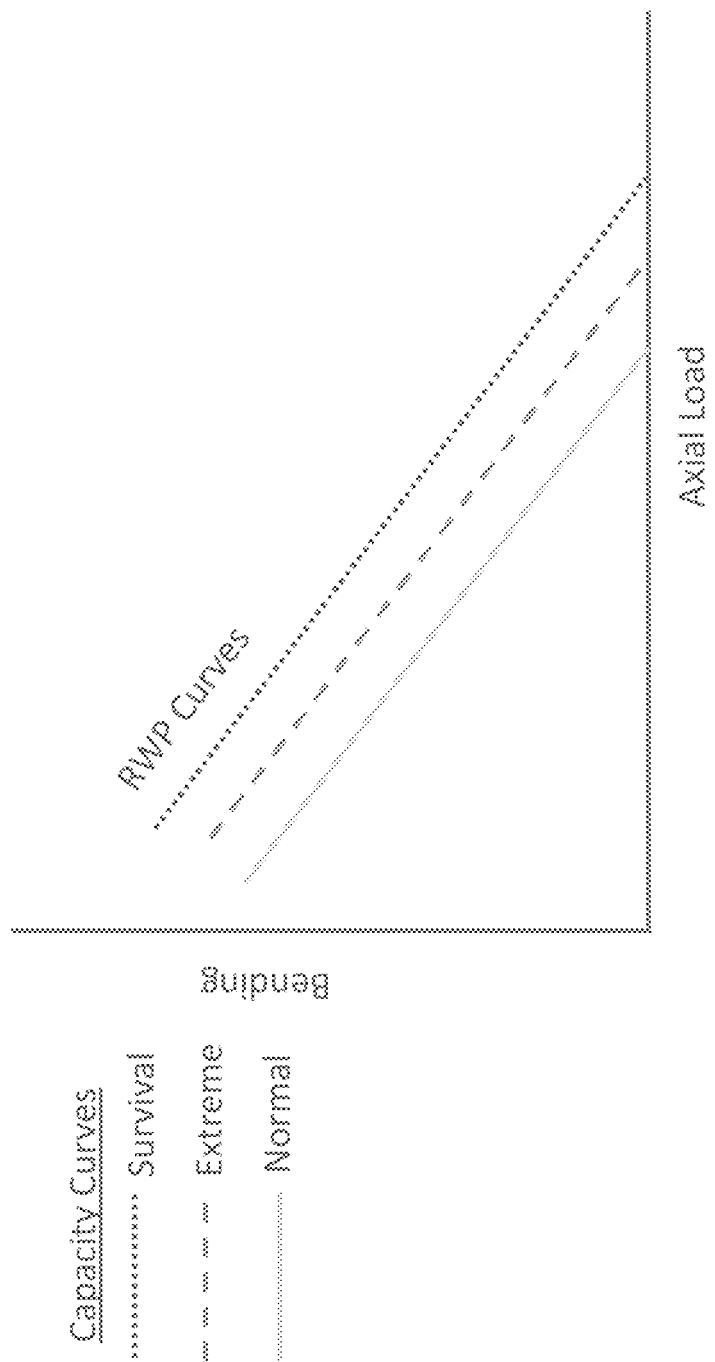

| MINIMUM VALIDATION TESTING OF DRILLPIPE CONNECTIONS | | | | |
|---|---|---|---|---|
| | SPECIMEN | SPECIMEN 1 | SPECIMEN 2 | SPECIMEN 3 |
| 502 | TOLERANCES<br>THREAD INTERFACE<br>SEAL INTERFACE<br>PIN & BOX<br>TAPER | EXTREME HIGH (XH)<br>EXTREME HIGH (XH)<br>PIN FAST<br>BOX SLOW | EXTREME HIGH (XH)<br>EXTREME LOW (XL)<br>PIN SLOW<br>BOX FAST | LOW (L)<br>LOW (L)<br>PIN SLOW<br>BOX FAST |
| 504 | MAKE AND BREAK TESTING<br><br>THREAD COMPOUND AMOUNT<br>(DEFINED BY OEM)<br><br>MAKE-UP AND BREAK-OUT TORQUE<br>(DEFINED BY OEM) | #OF MBG-3<br>MINIMUM Thd COMP<br>MAXIMUM TORQUE<br><br>#OF MBG-24<br>MINIMUM Thd COMP<br>MAXIMUM TORQUE<br>FMU<br>MAXIMUM Thd COMP<br>MINIMUM TORQUE | #OF MBG-3<br>MINIMUM Thd COMP<br>MAXIMUM TORQUE<br><br>FMU<br>MAXIMUM Thd COMP<br>MINIMUM TORQUE | #OF MBG-3<br>MINIMUM Thd COMP<br>MAXIMUM TORQUE<br><br>FMU<br>MAXIMUM Thd COMP<br>MINIMUM TORQUE |
| 506 | CONNECTION BAKE-OUT | TEMP: MAX DESIGN<br>DURATION: 12Hrs | TEMP: MAX DESIGN<br>DURATION: 12Hrs | TEMP: MAX DESIGN<br>DURATION: 12Hrs |
| 508 | CONNECTION SEAL/ GASKET TESTING<br><br>*(LIMIT-EP: TO MAX ANTICIPATED EP)<br><br>*(LIMIT-COMPRESSION: TO MAX ANTICIPATED COMPRESSION) | NO SEALABILITY TESTING | TS-B*<br>$B^a$-80%-Q1, Q2,<br>$B^a$-95%-Q1, Q2, Q1<br>$B^a_b$-90%-Q1, Q2, Q1<br>$B^a_b$-90%-Q1, Q2, Q1<br><br>TS-A*<br>$A^a$-95%-Q1, Q2, Q3, Q4<br>$A^a$-95%-Q4, Q3, Q2, Q1 | TS-B*<br>$B^a$-80%-Q1, Q2,<br>$B^a$-95%-Q1, Q2, Q1<br>$B^a_b$-90%-Q1, Q2, Q1<br>$B^a_b$-90%-Q1, Q2, Q1<br><br>TS-A*<br>$A^a$-95%-Q1, Q2, Q3, Q4<br>$A^a$-95%-Q4, Q3, Q2, Q1 |
| 510 | CONNECTION EXTERNAL LOADING TESTING<br><br>RWP = RATE WORKING PRESSURE<br><br>LOAD STEPS FOR NORMAL, EXTREME SURVIVAL LOAD CAPACITY CURVES | EXTERNAL LOAD POINTS<br>LOAD STEPS<br>IP  BENDING @<br>RPW  75% TENSION<br>RPW  50% TENSION<br>RPW  25% TENSION<br>WITH 15 MIN HOLD FOR EACH LOAD STEP | | |
| 512 | POST SEALABILITY BREAK-OUT | | | BREAK-OUT FMU<br>MAXIMUM Thd COMP<br>MINIMUM TORQUE |
| 514 | LIMIT LOAD TESTING | LL1 MODIFIED<br>IP(RWP) +<br>TENSION TO FAILURE | LL3 MODIFIED<br>IP(300PSI) +<br>TENSION TO FAILURE | LL2 MODIFIED<br>50%TENSION +<br>IP TO FAILURE |
| 516 | END OF TEST | COMPLETE | COMPLETE | COMPLETE |

MINIMUM VALIDATION TESTING OF THREADED & COUPLED CONNECTIONS

| SPECIMEN | SPECIMEN 1 | SPECIMEN 2 | SPECIMEN 3 |
|---|---|---|---|
| TOLERANCES<br>THREAD INTERFACE<br>SEAL INTERFACE<br>PIN & BOX<br>TAPER | EXTREME HIGH (XH)<br>EXTREME HIGH (XH)<br>PIN FAST<br>BOX SLOW | EXTREME HIGH (XH)<br>EXTREME LOW (XL)<br>PIN SLOW<br>BOX FAST | LOW (L)<br>LOW (L)<br>PIN SLOW<br>BOX FAST |
| CONNECTION FUNCTIONAL TESTING<br>MAKE-UP | #OF MBG-24-A-SIDE<br>MINIMUM Thd COMP<br>MAXIMUM TORQUE<br>FMU-A-SIDE<br>MAXIMUM Thd COMP<br>MINIMUM TORQUE | FMU-A-SIDE<br>MAXIMUM Thd COMP<br>MINIMUM TORQUE | FMU-A-SIDE<br>MAXIMUM Thd COMP<br>MINIMUM TORQUE |
| THREAD COMPOUND AMOUNT<br><br>MAKE-UP TORQUE | #OF MBG-24-B-SIDE<br>MINIMUM Thd COMP<br>MAXIMUM TORQUE<br>FMU-B-SIDE<br>MAXIMUM Thd COMP<br>MINIMUM TORQUE | #OF MBG-3-B-SIDE<br>MINIMUM Thd COMP<br>MAXIMUM TORQUE<br>FMU-B-SIDE<br>MAXIMUM Thd COMP<br>MINIMUM TORQUE | #OF MBG-3-B-SIDE<br>MINIMUM Thd COMP<br>MAXIMUM TORQUE<br>FMU-B-SIDE<br>MAXIMUM Thd COMP<br>MINIMUM TORQUE |
| CONNECTION BAKE-OUT | TEMP: MAX DESIGN<br>DURATION: 12Hrs | TEMP: MAX DESIGN<br>DURATION: 12Hrs | TEMP: MAX DESIGN<br>DURATION: 12Hrs |
| CONNECTION SEAL/GASKET TESTING<br><br>*(LIMIT-EP: TO MAX ANTICIPATED EP)<br>*(LIMIT-COMPRESSION: TO MAX ANTICIPATED COMPRESSION) | NO SEALABILITY TESTING | TS-B*<br>$B^a$-80%-Q1, Q2,<br>$B^a$-95%-Q1, Q2, Q1<br>$B^a_b$-90%-Q1, Q2, Q1<br>$B^a_b$-90%-Q1, Q2, Q1<br><br>TS-A*<br>$A^a$-95%-Q1, Q2, Q3, Q4<br>$A^a$-95%-Q4, Q3, Q2, Q1 | TS-B*<br>$B^a$-80%-Q1, Q2,<br>$B^a$-95%-Q1, Q2, Q1<br>$B^a_b$-90%-Q1, Q2, Q1<br>$B^a_b$-90%-Q1, Q2, Q1<br><br>TS-A*<br>$A^a$-95%-Q1, Q2, Q3, Q4<br>$A^a$-95%-Q4, Q3, Q2, Q1 |
| CONNECTION EXTERNAL LOADING TESTING<br><br>RWP = RATE WORKING PRESSURE<br><br>LOAD STEPS FOR NORMAL, EXTREME SURVIVAL LOAD CAPACITY CURVES | EXTERNAL LOAD POINTS<br>LOAD STEPS<br>IP   BENDING @<br>RPW   75% TENSION<br>RPW   50% TENSION<br>RPW   25% TENSION<br>WITH 15 MIN HOLDS FOR EACH LOAD STEP | | |
| POST SEALABILITY BREAK-OUT | BREAK-OUT-B-SIDE<br>FMU-B-SIDE<br>MAXIMUM Thd COMP<br>MINIMUM TORQUE | BREAK-OUT-B-SIDE<br>FMU-B-SIDE<br>MAXIMUM Thd COMP<br>MINIMUM TORQUE | BREAK-OUT-B-SIDE<br>FMU-B-SIDE<br>MAXIMUM Thd COMP<br>MINIMUM TORQUE |
| LIMIT LOAD TESTING | LL1<br>IP(RWP) +<br>TENSION TO FAILURE | LL2<br>50%TENSION +<br>IP TO FAILURE | LL3<br>IP(300psi) +<br>TENSION TO FAILURE |
| END OF TEST | COMPLETE | COMPLETE | COMPLETE |

TESTING AND VALIDATION OF CONNECTORS FOR SUBSEA INTERVENTION RISER SYSTEMS

CROSS REFERENCE TO RELATED APPLICATIONS

The present application claims priority to U.S. Provisional Patent Application No. 62/990,662 filed Mar. 17, 2020, the entire content of which is incorporated herein by reference.

TECHNICAL FIELD

The present disclosure relates generally to methods for testing and validating drill pipe connectors and threaded and coupled connectors for use in subsea intervention riser system (open-water or through-riser) conditions while in accordance with Annex E of API 17G.

BACKGROUND

American Petroleum Institute ("API") Standard 17G is the industry standard for subsea intervention systems that addresses both completion/workover riser ("CWOR") open-water systems and thru-BOP/drilling riser ("through-riser") systems. Annex E of API 17G defines the various test types for validation testing of connectors. However, application of these test types for drill pipe and threaded & coupled ("T&C") connectors is subject to substantial interpretation as API 17G does not prescriptively define requirements. That is, while the types of tests are defined in API 17G, Annex E is not fully prescriptive for each test scope's full requirements, especially in high pressure and high temperature subsea applications. As such, a validation test program may be different between two suppliers for similar product. This can lead to different test scopes for the same product when proposed by different groups.

BRIEF SUMMARY OF EXAMPLE EMBODIMENTS

An embodiment of the disclosure is a method for validation testing pipe connectors for oil and gas systems comprising: testing a first connector using the following steps, in order: 1) making-up and breaking-out a first connector a first predetermined number of times; 2) making-up the first connector; 3) heating the first connector to a predetermined temperature creating a first baked out connector; 4) bending the first baked out connector at a stated capacity limit; 5) placing the first baked out connector under a first failure condition; testing a second connector using the following steps, in order: 1) making-up and breaking-out the second connector a second predetermined number of times; 2) making-up the second connector; 3) heating the second connector to the predetermined temperature creating a second baked out connector; 4) testing the sealability of the second baked out connector under a first predetermined load condition; and 5) placing the second baked out connector under a second failure condition; testing a third connector using the following steps, in order: 1) making-up and breaking-out the third connector a third predetermined number of times; 2) making-up the third connector; 3) heating the third connector to the predetermined temperature creating a third baked out connector; 4) testing the sealability of the third baked out connector under a second predetermined load condition; and, 5) placing the third baked out connector under a third failure condition; and testing a fourth connector using the following steps, in order: 1) making-up the fourth connector; 2) cyclically testing the fourth connector under a cyclically occurring fourth failure condition.

In some embodiments, the first predetermined number of times is about 27 and the second predetermined number of times is about 3. In specific embodiments, the first failure condition is internal pressure at rated working pressure and tension added to failure, the second failure condition is internal pressure to about 300 psi and tension to failure, the third failure condition is about 50% tension with internal pressure to failure, and the fourth failure condition is cyclic mean stress to failure. In some embodiments, the first and second predetermined load conditions comprise one of tension, compression, internal pressure, and external pressure. In some embodiments, failure occurs when the connector leaks. In specific embodiments, the predetermined temperature is about the maximum rated temperature for the first connector. The first connector's stated capacity limit can be determined by a manufacturer of the connector.

In some embodiments, the first, second, third, and fourth connectors each comprise a first drill pipe comprising a pin and a second drill pipe comprising a box. Specific embodiments comprise breaking-out and making-up the third baked out connector before placing the third baked out connector under a third failure condition and after placing the third baked out connector under the second predetermined load condition. In some embodiments, the first connector, the second connector, the third connector, and the fourth connector are the same type of connector manufactured to different tolerances.

Specific embodiments further comprise testing a fifth connector, a sixth connector, a seventh connector, an eighth connector, and a ninth connector using the following steps, in order: 1) making-up the fifth connector, the sixth connector, the seventh connector, the eighth connector, and the ninth connector; 2) cyclically testing the fifth connector under a cyclically occurring fifth failure condition; 3) cyclically testing the sixth connector under a cyclically occurring sixth failure condition; 4) cyclically testing the seventh connector under a cyclically occurring seventh failure condition; 5) cyclically testing the eighth connector under a cyclically occurring eighth failure condition; and, 6) cyclically testing the ninth connector under a cyclically occurring ninth failure condition.

In some embodiments, the first, second, third, and fourth connectors each comprise a first pipe comprising a first pin, a second pipe comprising a second pin, and a coupling comprising a first box on one end of the coupling and a second box on an opposite end of the coupling. In specific embodiments, making-up and breaking-out the first connector the first predetermined number of times comprises making-up and breaking-out the first connector's first pin to the first connector's first box about 24 times, and making-up and breaking-out the first connector's second pin to the first connector's second box about 24 times; wherein making-up and breaking-out the second connector the second predetermined number of times comprises making-up and breaking-out the second connector's second pin to the second connector's second box about 3 times; and, wherein making-up and breakout-out the third connector the third predetermined number of times comprises making-up and breaking-out the third connector's second pin to the third connector's second box about 3 times.

In some embodiment, bending the first baked out connector comprises keeping an internal pressure of the first baked out connector at a rated working pressure and, in order, 1) bending the first baked out connector to rated bending capacity while applying about 75% rated tensile capacity, 2) bending the first baked out connector to rated bending capacity while applying about 50% rated tensile capacity, and 3) bending the first baked out connector to rated bending capacity while applying about 25% rated tensile capacity. Some embodiments comprise breaking-out and making-up the first baked out connector, the second baked out connector and the third baked out connector before placing the connectors under the first, the second, and the third failure condition, respectively.

In specific embodiments, making-up the fourth connector comprises making-up the connection between the fourth connector's first pin and the fourth connector's first box, and making-up the connection between the fourth connector's second pin and the fourth connector's second box. In some embodiments, the fourth and fifth cyclically occurring failure conditions are high cyclic mean stress to failure, the sixth and seventh cyclically occurring failure conditions are medium cyclic mean stress to failure, and the eighth and ninth cyclically occurring failure conditions are low cyclic mean stress to failure. Some embodiments further comprise breaking-out each connector after failure.

In specific embodiments, the first connector comprises extreme high thread interference, extreme high seal interference, a fast pin, and a slow box; wherein the second connector comprises extreme high thread interference, extreme low seal interference, a slow pin and a fast box; wherein the third connector comprises low thread interference, low seal interference, a slow pin and a fast box; and, the fourth connector comprises nominal thread interference, nominal seal interference, a nominal pin and a nominal box.

BRIEF DESCRIPTION OF THE DRAWINGS

The drawings illustrate only example embodiments of methods, systems, and devices for compositions and methods of connectors for intervention riser systems and are therefore not to be considered limiting of the scope of the disclosure. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

FIG. 4 illustrates a typical API 17G connector load capacity chart. The capacity curves from the bottom of the graph to the top are normal, extreme, and survival, for two stated internal pressure values.

FIG. 5 illustrates an embodiment of validation testing of drill pipe connectors which focuses on testing for connector sealing.

FIG. 6 illustrates an embodiment of validation testing of drill pipe connectors which focuses on testing for connector cyclic load failure (fatigue).

FIG. 7 illustrates an embodiment of validation testing of T&C connectors which focuses on testing for connector sealing.

FIG. 8 illustrates an embodiment of validation testing of T&C connectors which focuses on testing for connector cycle load failure (fatigue).

DETAILED DESCRIPTION OF EXAMPLE EMBODIMENTS

Figure 1:
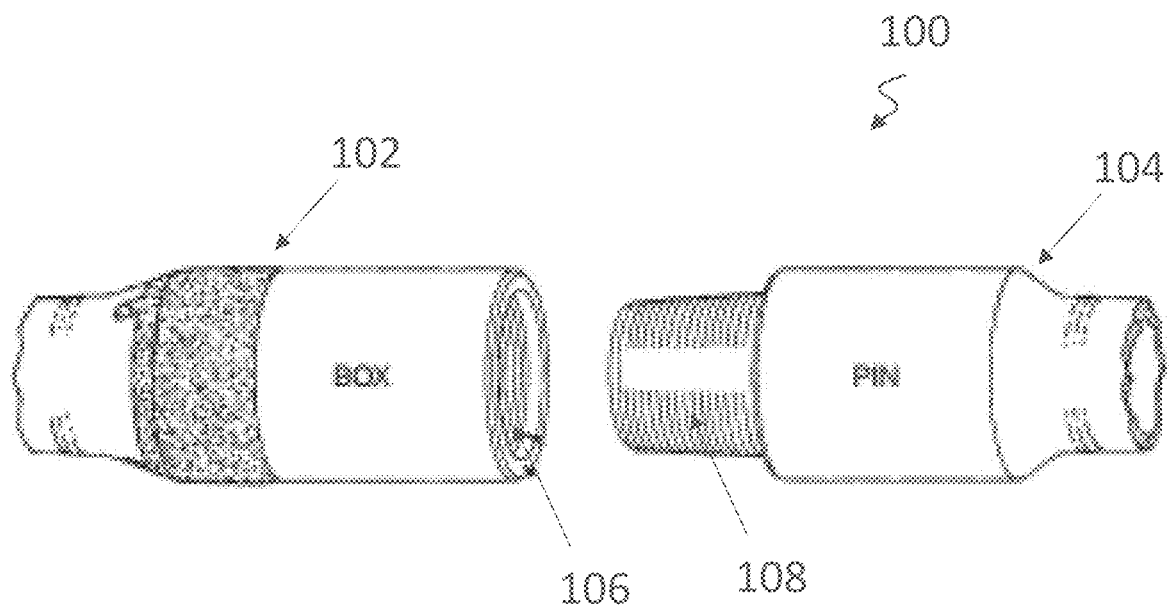
FIG. 1 illustrates an example drill pipe connector.

Presented herein is a novel application of an industry standard that allows companies to standardize testing scopes of work across multiple suppliers such that validation testing can be conducted across entire enterprises. Embodiments define the minimum testing and/or validation methods for riser connectors for use in either open-water riser applications or through-riser landing string applications under API 17G Annex E. Embodiments of the validation testing disclosed herein reduce the validation testing time and ensure the connectors are compliant with API 17G. An embodiment of the disclosure is a methodology or qualification plan of how to test drill pipe and T&C connectors such that they comply with industry requirements based on predetermined failure modes. Embodiments of the disclosure can be used in high pressure and high temperature applications to mitigate failure modes. In some embodiments, the testing for drill pipe or T&C connectors is done for applications that are at a high pressure and high temperature (HPHT). In embodiments, some steps of testing are done at high pressure and/or high temperature.

The example embodiments disclosed are directed to methods for testing and/or validating drill pipe and T&C connectors. Specific embodiments are testing and/or validation methods that conform to Annex E of API 17G; however, the instructions of the API 5C5 are interpreted such that they can be used for validation testing on drill pipe and T&C connectors for intervention riser systems (open-water riser connectors and inner riser landing string connectors). In some embodiments, other tests are used from other sections of the API 5C5. However, API 5C5 is directed to downhole tubulars which require different load spectrums than open-water intervention riser connections or through-riser intervention riser connections. Further, API 17G is ambiguous regarding testing connector failure modes. That is, industry standards do not currently provide criteria to fully address the minimum requirements of riser connectors for open-water risers and landing strings. Example embodiments herein are processes to ensure riser connectors are fit for use in specific applications, regardless of connection type/style (e.g., drill pipe, T&C).

"Validation testing" as used herein refers to testing scopes that are to be used in an oil and gas project to demonstrate that the equipment meets stated functional requirements and manufacturer's technical specification capacities. This testing occurs prior to deployment in the field.

"Connector," as used herein, refers to any structure that connects two pipes through a pin and a box connection. A "pin" or "pin connection" is defined as external threads on the outside diameter of a pipe section. A "box" or "box connection" is defined as internal threads on the inside diameter of a pipe section. A "coupling," as used in T&C connectors, is defined as a short section of pipe with a box connection on each end. A drill pipe style connector is defined as one pin connection made up to one box connection. A T&C style connector is defined as two pin connections made up to opposite sides of a single coupling's box connections.

FIG. 1 illustrates an example of a drill pipe connector 100. The drill pipe connector 100 comprises two drill pipes 102 and 104. Only the box side of drill pipe 102 is shown which comprises internal threading 106. Only the pin side of drill pipe 104 is shown which comprises external threading 108.

Figure 2:
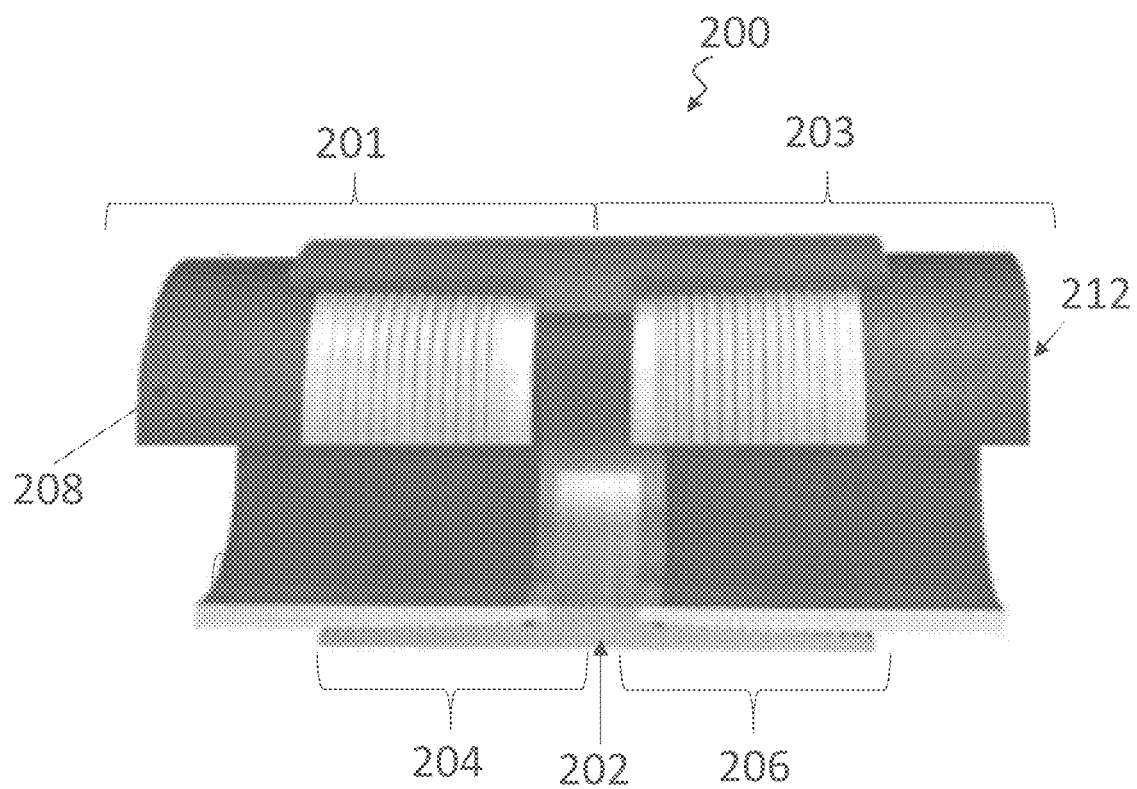
FIG. 2 illustrates an example T&C connector.

FIG. 2 illustrates an example of a T&C connector 200. The T&C connector has an A-side 201 and a B-side 203. The T&C connector 200 comprises a coupling 202, an A-side riser (or pipe) 208, and a B-side riser (or pipe) 212. The coupling 202 comprises an A-side box 204 and a B-side box 206. The A-side riser 208 comprises an A-side pin 210 and the B-side riser 212 comprises a B-side Pin 214. Only one end of risers 208 and 212 are shown, but it should be understood that they both extend outward until each end with a pin (not shown).

As used herein, "making-up" or "make-up" refers to assembly of a pin and box connection e.g. threading a pin into a box. "Breaking out" or "break-out" refers to disassembly of a pin and box connection e.g. unthreading a pin from a box. For drill pipe and T&C connectors, the make-up or break-out is achieved by application of torque to make-up or break-out the threaded connection.

"Pipes" or "tubulars" as used herein, refers to riser pipe or drill pipe. A riser is a tubular which comprises a pin on both ends. A drill pipe is a tubular which comprises a pin on one end and a box on the other end.

"About," as used herein, generally refers to an example value or a range of numbers that one of ordinary skill in the art would consider as a reasonable amount of deviation to the recited numeric values (i.e., having the equivalent function or result). For example, this term "about" can be construed as including a deviation of ±10 percent of the given numeric value provided such a deviation does not alter the end function or result of the value. Therefore, a value of about 1% can be construed to be a range from 0.9% to 1.1%.

Example embodiments will be described more fully hereinafter, in which example methods for validating drill pipe and T&C connectors are described. It should be understood that systems, apparatuses, compositions, load values (e.g., pressure, temperatures, tension, compression and bending) and methods mentioned herein may be embodied in many different forms and should not be construed as limited to the example embodiments set forth herein. Rather, these example embodiments are provided so that this disclosure will be thorough and complete, and will fully convey the scope of the claims to those of ordinary skill in the art. Like, but not necessarily the same, elements in the various figures are denoted by like reference numerals for consistency.

In embodiments of the disclosure, a single type of connector manufactured to different tolerances may be tested. For example, a single type of connector may be manufactured to worst-case performance. Connectors manufactured to different tolerances are called "specimen" herein. In embodiments, the different tolerances include seal diameters, thread tapers, pin nose thickness, thread diameters, and/or surface roughness. For example, a T&C connector will have tolerances for thread interference, seal interference, and pin & box taper. Tolerances for thread interference and seal interference can be defined as extreme high, high, nominal, low, or extreme low. Tolerances for pin or box taper can be defined for either as fast, nominal, or slow. Specific definitions of high, low, fast, and slow are known in the art and can be found in documents such as API 5C5 and/or defined by the manufacturer.

General embodiments of the disclosure comprise steps such as make and break testing, a connection bake-out, external load testing, sealability testing, and fatigue testing, and failure testing. In embodiments these tests are done on specimens that are a single type of connector but are made to different tolerances. The type and/or tolerances can be defined by the design specifications, the manufacturer, and/or API 5C5 or API 17G. In embodiments, additional tests and steps are added, such as burst testing, break in make and breaks prior to make and break testing, hydrostatic testing, combined load testing, post sealability break-out, load to failure, and limit load testing to failure. In some embodiments, there are differences in additional testing within the methods of validation testing between drill pipe and for T&C connectors. Additional embodiments include hydrostatic seal testing. Tests can be done with additional temperature, internal pressure, external pressure, compression, tension, bending, etc. It should be noted that requirements change, and as such, the parameters listed in the numbered portion below should not limit the scope of the claims unless explicitly recited in the claims.

Embodiments of the disclosure include make and break testing. In make and break testing, connections are made-up and broken-out a predetermined number of times at predetermined conditions. For example, with a drill pipe connection, two drill pipes are connected and separated with a predetermined amount of torque and connection compound (such as grease) a predetermined number of times. In embodiments, the maximum torque, minimum torque, specific gravity, and/or area of application of the connection thread compound is predetermined by either the manufacturer or the field application. In another example, a T&C connector is connected to a riser and then separated a predetermined number of times at either side. In embodiments, only one side of a T&C connector can be made-up and broken-out (such as the A side), and in other embodiments both sides of the T&C connector are made-up and broken-out (A and B side). In specific embodiments, there are about 3-100 cycles of make and break. It should be noted that API 17G uses one specimen at 10 cycles (make/break) for risers with thread re-cut capability. Further, API 5C5 describes the use of 3 make and break cycles for casing applications and 10 make and break cycles for tubing applications for downhole applications (permanently installed, once, in a well). Thus, there is a disparity between the testing protocols of API 5C5 and API 17G. In embodiments, the predetermined number of make and break cycles performed are based on the number of deployments in an offshore campaign with a safety factor applied to ensure multiple deployments before returning the connectors for re-cut/refurbishment. In embodiments, the make-break cycle count accounts for a multi-well campaign where the connector could be used for through-riser landing string operations.

In embodiments, the make-up of the connection is done at a predetermined torque. In embodiments, the make-up of the connection is done between the maximum or the minimum torque recommended by the manufacturer. In specific embodiments, the torque used to connect and separate a drill pipe is between the manufacturer's specified make-up and break-out torque ranges (minimum and maximum). In embodiments, the number of make and break cycles could range from 10 to 100. In specific embodiments, the torque used to connect and separate risers with T&C connectors is between the manufacturer's specified make-up and break-out torque ranges (minimum and maximum). In some embodiments, make and break testing includes a break in period. In specific embodiments, the break in period is three make and break cycles. In embodiments, the make and break cycles are applied to three different specimens. In embodiments, the minimum requirements for make-break are 3 make-break cycles done for a specimen. In an embodiment of T&C connectors, specimen conditions (machine/make-up) can be applied to only one side (i.e. Side A) of the connection or to both sides of the T&C connection (Side A and Side B). In embodiments, after finishing the make and break cycles, the connectors are connected a final time (final make-up (FMU) for additional testing. In some embodiments, specimens do not undergo make and break, and instead undergo only FMU. In specific embodiments, make and break cycles plus the final make-up equals 25 make-ups prior to additional testing. In other embodiments, this can be 4 make-ups prior to additional testing. In some embodiments, for drill pipe connectors, the drill pipe torque shoulder groove will be applied after make-break cycles but before FMU. In embodiments, for connectors that have a pin nose shoulder and metal nose seal, a torque shoulder groove can be applied, prior to FMU.

In some embodiments, sealability testing addresses and exceeds the API 17G hydrostatic pressure test requirements with use of internal pressures exceeding the hydrostatic pressure requirements of API 17G. In some embodiments the number of make-up and break-out cycles is in excess of the API 17G and API 5C5 requirements and is based on the defined application of operations before maintenance and refurbishment operations. In certain embodiments, for qualification of connections for both open-water and through-riser applications, the external pressure loads are tested to the higher of either open-water hydrostatic pressures or hydrostatic pressures in through-riser applications.

Embodiments of the disclosure include a connection bake-out. Connection bake-out ages the connector thread compound in order to put the connector into the worst-case condition for sealability testing. Bake out essentially degrades the connector thread compound. Baking out also pre-outgases the connection such that there are no false failure signatures during sealability testing at elevated temperature. Baking out a connector comprises heating the connector to a predetermined temperature for a predetermined amount of time. In embodiments, the predetermined temperatures are about 275-356° F. In specific embodiments the predetermined temperature is about 275° F. In embodiments, the predetermined amount of time is in the range of about 12-36 hours. In specific embodiments, the predetermined temperature is about 12 hours. In an embodiment, the predetermined temperature is the connector's maximum temperature rating. In some embodiments, the temperature is the maximum temperature that the connector will experience when deployed. In additional embodiments, the temperature is the maximum temperature plus about 15° F. that the connector will experience when deployed. In some embodiments, the bake out is performed per API 5C5 7.3.2.3 for all specimens prior to sealability tests.

Embodiments of the disclosure include sealability testing. Sealabilty testing involves testing a connection to several overall stress thresholds under different load conditions. In some embodiments, the load conditions are internal pressure, external pressure, tension, and/or compression. In embodiments, the load conditions are applied at ambient temperature and/or at elevated temperature. In embodiments, ambient temperature is between 68-74° F. In some embodiments, elevated temperature is about 275° F. In an embodiment, the predetermined temperature is the connector's maximum temperature. In some embodiments, the temperature is the maximum temperature that the connector will experience when deployed. In additional embodiments, the temperature is the maximum temperature plus 15° F. that the connector will experience when deployed. Embodiments of sealability testing can include axial compression testing. In embodiments, specific tests are taken from API 5C5 but with modifications such as eliminating elevated testing in test series A, removing test series C and/or increasing test series B von Mises equivalent (VME) stress. Test procedures and equipment setup can also be found in API 5C5. In embodiments, the testing fluid is a liquid or a gas. In embodiments with API 17G PSL3G requirements, general product development or multiple project application, the test medium shall be performed with gas. In embodiments with API 17G PSL3 requirements, the test medium can be performed with liquid. In some embodiments, after sealability testing occurs the connector may be broken-out and inspected and remade up. If sealability testing fails, a redesign may be necessary.

Embodiments of the disclosure include external load testing. External load testing can be done at rated working pressure (RWP) (the predetermined pressure at which the connector will be rated by the manufacturer). In embodiments, the external load testing can be done with internal pressure at RWP and with additional bending and tension loads. In embodiments, the manufacturer-calculated bending load value at a given pressure value, when determined with about 75%, about 50%, and/or about 25% tension can be added to the specimen undergoing external combined load testing. The percent tension values are based on the manufacturer's defined maximum (100%) tension capacity for a given internal pressure. In embodiments, when under an internal pressure of RWP, a specimen can undergo combined loading with calculated bending with about 75% tension with about a 15 minute hold, followed by combined loading with about 50% tension with about a 15 minute hold, followed by combined loading with about 25% tension with a 15 minute hold. 100% of tension is defined by the manufacturer, API 17G, or API 5C5. In some embodiments, the combined loads are held for between 5 minutes to 1 hour long.

Embodiments of the disclosure include failure testing. Failure testing (or limit load testing) involves testing a connection to failure to demonstrate the failure modes under different load conditions. Failure testing can include cyclic load testing, pressure testing, and/or tension testing. In embodiments, limit loads are done as per API 5C5. In some embodiments, break-out is done after failure, the connector is inspected, and the failure mode is documented.

Embodiments of the disclosure include a cyclic load test (fatigue test). Fatigue testing is the application of cyclic load cycles for purposes of validating the number of load cycles a connector can withstand before failure. Embodiments of fatigue testing comprise the use of six or more specimens. In some embodiments, there are 6, 7, 8, 9, 10, 11, 12, 13, 14, 15, 16, 17, 18, 19, 20, 25, 30, 35, 40 or more specimens.

In some embodiments, failure testing includes fatigue testing (alternating different loads) which is cyclical load testing at different stress levels (load levels). In embodiments, cyclic load testing is carried out until failure. In embodiments, the connection is broken out after failure to be inspected. In some embodiments, fatigue testing is done with six samples where two samples are tested at high stress, two samples are tested at medium stress and two samples are tested at low stress. In embodiments, a failure target is a number of testing cycles based on stress level (e.g. high stress) that can be performed before the specimen is expected to fail. High, medium, and low stress is defined by the manufacturer (OEM), API 17G or API 5C5.

In some embodiments, limit load testing includes internal pressure and tension to failure applied to a specimen. In embodiments, a specimen undergoes limit load testing which comprises bringing the specimen to internal pressure and then adding an increasing tension until the specimen fails or bringing the specimen to tension and then increasing the internal pressure to failure. In embodiments, a specimen undergoes limit load testing which comprises bringing the internal pressure to a predetermined amount, such as 300 psi, and then applying an increasing tension until the specimen fails. In some embodiments, a specimen undergoes 50% tension and then an internal pressure is applied until failure. Once failure or leak occurs, the specimen is broken out and inspected. The failure mode is then documented.

In some embodiments, where the failure modes are identified during FMEA or FMECA sessions, such that mitigations can be implemented, where possible, either through design changes, verification and validation tasks. In embodiments, Failure Mode, Effects & Criticality Analysis (FMECA) can be performed prior to testing. In some embodiments, a design review is performed after FMECA and before testing (review of engineering drawings and the details of the connections are made).

Embodiments of the process include failure mode identification after a specimen is taken to failure. By identifying the failure modes, mitigations are identified by either verification or validation work to ensure the performance of the connector meets the specified requirements. Riser connector failure modes/causes may include (but are not limited to) galling, loss of preload, burst, buckling, tensile parting, tensile/bending parting, fatigue, corrosion, erosion, brittle fracture, loss of seal, preload exceedance, lack of preload, external pressure collapse, wear/abrasion, etc. In some embodiments, an acceptable failure mode is a failure in the last engaged thread of the pin. In some embodiments, an unacceptable failure mode is a failure in a metal to metal seal. In some embodiments, if the failure is in the pipe body it is a manufacturing defect and another specimen to the same tolerances is retested. In some embodiments, a failure mode that is not found in the last engaged thread of the pin is unacceptable. One of skill in the art would recognize acceptable and unacceptable failure modes.

In embodiments, the validation work can be a range of tests to demonstrate the product complies with the functional requirements for the specified environment. In embodiments, the validation work scopes may include variations in product designs (e.g., different tolerance or make-up/preload conditions i.e. specimen), mimic of production unit processing or field conditions, and physical testing configurations. In some embodiments, the product's previous history can be considered to gain insight to actual product performance and failure modes. This may provide a basis for adjusting the minimum test scope requirements (reduction or additions) to ensure failure modes are adequately addressed. Embodiments of this process can be applied to each riser connector design per application and functional requirements to ensure the connector design is fit for use in the application. Embodiments of the disclosure can focus on failure mode process so validation methods that concern failure modes are used.

The Figures below are included for descriptive purposes.

Figure 3:
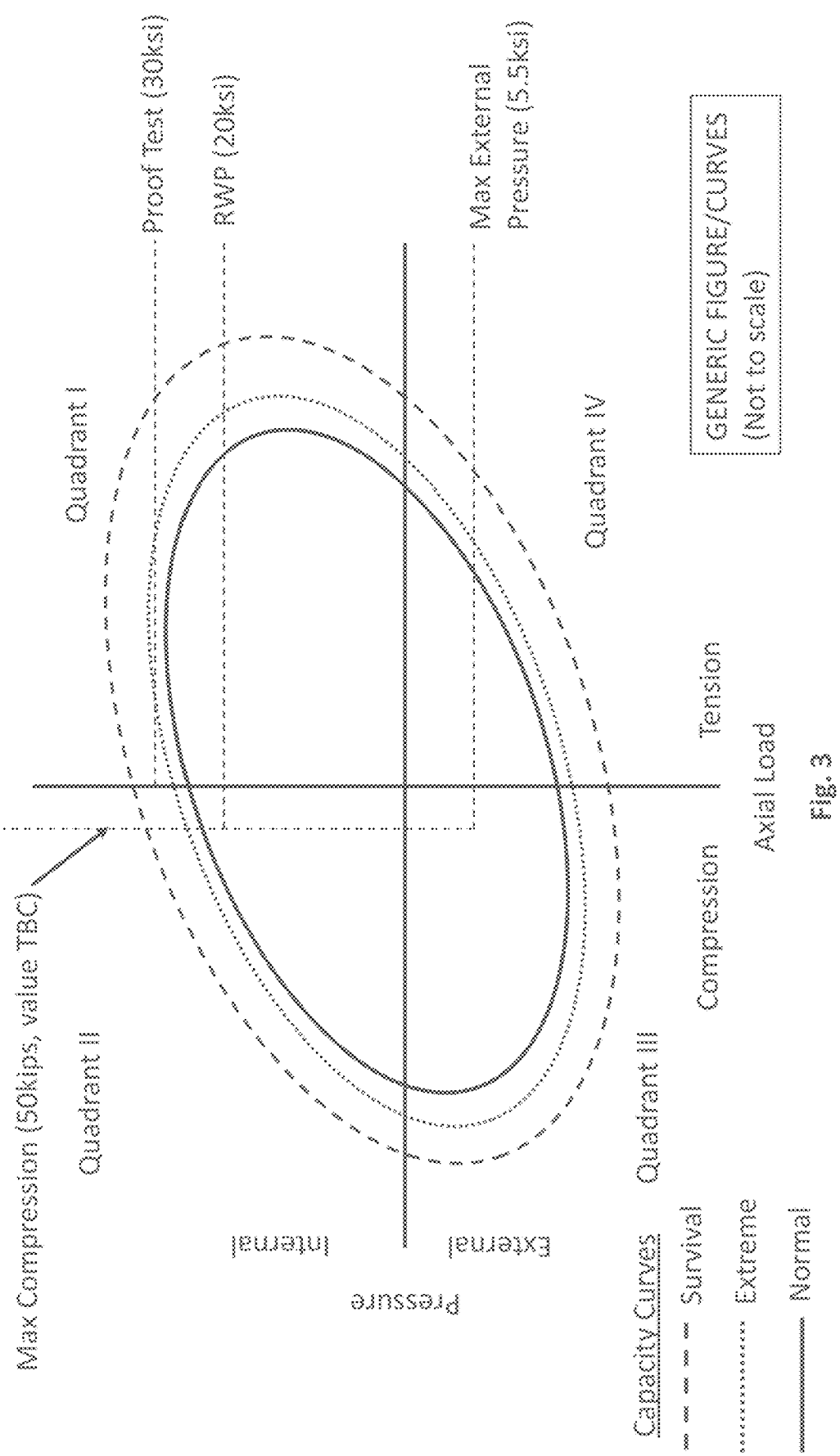
FIG. 3 illustrates the relationship of an API 5C5 von-Mises equivalent (VME) curve with the API 17G riser/landing string connection rating designations.

The VME curves in FIG. 3 illustrate the API 17G riser/landing string connection operating envelope compared to an API 5C5 downhole tubular testing program. This figure helps illustrate that the quadrant II, III and IV testing regimes of API 5C5 are far in excess of an API 17G riser connection load and do not represent load cases or failure modes for an API 17G riser connection. RWP is the stated pressure capacity in 17G for the connection. The dotted lines represent theoretical capacity limits using 17G criteria which illustrates that the 5C5 testing envelopes are well in excess of what 17G requires. When considering the potential primary failure modes (tension, pressure) and testing to validate performance, quadrant I loading appears to be the most appropriate load cycle area. Loads in quadrants II, III & IV can be limited to specified design capacity values.

Additionally, the API 5C5 test program that uses various percentages of VME (80, 85, 90, 95) do not necessarily support testing the 67, 80, 100% ranges of API 17G. Reconciling the API 5C5 testing program against API 17G is a challenge as the connector designers traditionally have not previously worked to API 17G's proposed validation testing scope. It is clear that there are different perspectives on how to select load points and testing scopes (API 5C5 vs. API 17G). In practice, this type of ellipse graph will be provided by the manufacturer.

FIG. 4 illustrates a typical API 17G connector load capacity chart for comparison purposes, illustrating capacity curves (normal, extreme, survival) from the bottom of the graph to the top of the graph for two internal pressures (RWP and a low pressure). In practice, this type of graph will be provided by the manufacturer.

Specific embodiments of the validation and testing methods are described in further detail below. In embodiments where there is an existing product line with design consistency, partial extrapolation may be used when reviewed/accepted by a subject-matter expert. In embodiments where a new supplier or product line is being considered, this scope represents the minimum scope, and additional test scope can be added based on the failure modes identified during the FMECA process.

Embodiments of Testing Scope Summaries

An Embodiment of Testing Scope for a Drill Pipe Connector

Figure 6:
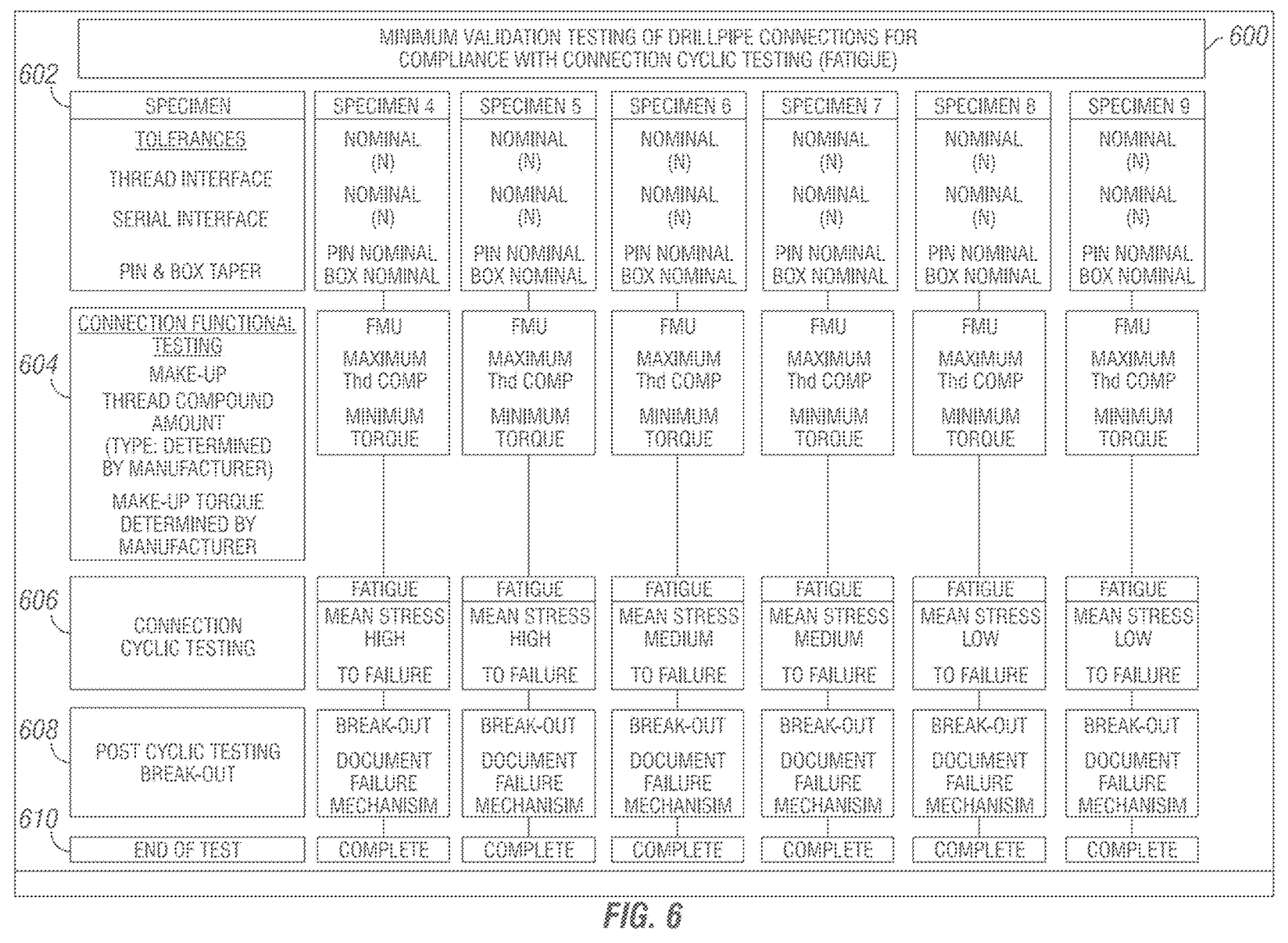

FIGS. 5 and 6 illustrate an example embodiment of drill pipe connector validation testing. The column on the left illustrates the general steps of the method, while the other columns illustrate a specific method comprising testing a variety of individual specimen. A specimen, as used in this example, is a drill pipe with a pin and a drill pipe with a box made-up together.

FIG. 5 illustrates sealability testing. The general embodiment of minimum validation testing of drill pipe connections 500 starts in step 502 with receiving one or more specimen that are manufactured to certain tolerances for thread interference, seal interference, and taper of the pin and box. Although the tolerances for Specimen 1, Specimen 2, and Specimen 3 have differences, the connectors are the same type. The minimum and maximum tolerances for these parts are provided from the manufacturer, which the manufacturer determined from initial configuration engineering drawings with appropriate tolerances provided. Tolerances such as extreme high, extreme low, etc. are determined by API 5C5 as percentages of the maximum and minimum tolerances provided by the manufacturer. Manufacturing these dimensions to the extreme tolerances can test worst-case conditions for sealability and for make and break performance.

The specimens (i.e. 1, 2, and 3) then undergo make and break testing in step 504. The make and break testing includes specifics on the type and amount of thread compound, which is defined by the manufacturer, and the make-up torque applied. Specimen 1 undergoes 3 cycles of make-up and break-out (make and break for galling, MBG) with a minimum amount of thread compound and a maximum torque, followed by another 24 cycles of make-up and break-out with minimum thread compound and maximum torque. Specimen 1 then undergoes a final make up with maximum thread compound and minimum torque, leaving the connector fully connected. Specimen 2 undergoes 3 cycles of make-up and break-out with minimum thread compound and maximum torque, followed by a final make up with maximum thread compound and minimum torque leaving the connector fully connected. Specimen 3 undergoes 3 cycles of make-up and break-out with a minimum amount of thread compound and maximum torque, followed by a final make up with maximum thread compound and minimum torque leaving the connector fully connected. Thread compound and torque are defined by the manufacturer.

The specimens (i.e. 1, 2, and 3) then undergo a connection bake-out in step 506. In this step, the connector is heated to the maximum temperature for the design, which is project specific, for about 12 hours.

One or more specimens (2 and 3 in the example of FIG. 5) then undergo connection seal and gasket testing in step 508. The tests are limited to maximum anticipated external pressure and to maximum anticipated compression. The testing parameters for this test are pulled from the VME Curve, similar to the ellipse illustrated in FIG. 3, that is generated by the manufacturer. Test series (TS) B is internal pressure with tension and compression. TS A is internal and external pressure with tension and compression. Quadrants (Q) are defined as seen in FIG. 3 with quadrant 1 (Q1) being internal pressure and tension, quadrant 2 (Q2) being internal pressure and compression, quadrant 3 (Q3) being external pressure with compression and quadrant 4 (Q4) being external pressure and tension. The superscript defines whether the test is done under ambient (a) or elevated (e) temperatures. The b subscript indicates that bending is added. With the lower value of the VME curve (see example of FIG. 3), the maximum anticipated external pressure, or the maximum anticipated compression defining the maximum used load, Specimen 2 first undergoes 80% of Q1 followed by 80% of Q2 at ambient temperature. Specimen 2 then undergoes testing with 95% of Q1, Q2, and Q1, in series, at ambient temperature; followed by a round of 90% Q1, Q2, Q1, in series, at elevated temperature; and then another round of 90% Q1, Q2, Q1 testing, in series, at ambient temperature. Specimen 2 then undergoes TS A at 95% of Q1, Q2, Q3, Q4, in series, at ambient temperature. Then Specimen 2 undergoes another round at 95% of Q4, Q3, Q2, Q1, in series, at ambient temperature. Specimen 3 also goes through TS-B and TS-A testing as notated in FIG. 5. All percent of quadrant maximums in the above tests may be limited to maximum anticipated external pressure and to maximum anticipated compression, in which case they may not follow the percent of the curve in the VME curve (see example of FIG. 3), all at the internal pressure of RWP.

Instead of undergoing seal testing, Specimen 1 undergoes external load testing in step 510. External load testing is done with an internal pressure equal to RWP and the manufacturer calculated bending values, based on 75% of max tension as defined by the manufacturer for 15 minutes. Specimen 1 then moves to combined loading with bending based on 50% of the max tension and then to combined loading with bending based on 25% of the max tension for 15 minutes each.

Following seal testing, Specimen 3 undergoes a post-sealability break out in step 512. In this step the pin and box are broken-out and the breakout torque of the post-sealability connector is compared to the torque measured from break-out in the make and break phase for specimen 3. Specimen 3 then undergoes another final make-up at maximum thread compound and minimum torque.

Following external load testing for specimen 1 (step 510), TS-A for specimen 2 (step 508), and post-sealability break-out for specimen 3 (step 512), all specimens may undergo limit load testing in step 514. Specimen 1 undergoes testing at an internal pressure of RWP and tension is then applied to failure. Specimen 2 undergoes testing at an internal pressure of 300 psi and then tension is applied to failure. Specimen 3 undergoes 50% tension and then internal pressure is applied to failure. Failure is defined by loss of internal pressure or yielding of the connection. In step 516, the example sealability testing method illustrated in FIG. 5 is complete.

After testing, the specimens are broken-out, inspected, and the failure mode is documented. If failure does not occur at an expected or acceptable location in the connection, the specimen fails testing.

FIG. 6 illustrates fatigue testing. The general embodiment of minimum validation testing of drill pipe connections with connection cyclic testing 600 starts in step 602 with receiving one or more specimens that are manufactured to a certain tolerance. The tolerances for Specimens 4-9 are the same. Each specimen has nominal thread interference, nominal seal interference, and a nominal pin and box taper. Nominal is when the tolerance is the primary dimension that is given in the specification drawings by the manufacturer. All six specimens then undergo final make up in step 604 with a maximum amount of thread compound and a minimum amount of make-up torque as determined by the manufacturer.

The specimens then undergo connection cyclic testing in step 606. In this step, a fatigue machine is used to stress the connector at a specific stress state until the connector fails. High, medium and low stress states are agreed to between the operator and the manufacturer. Failure is defined by loss of internal pressure or yielding of the connection.

After failure, each specimen undergoes a post cyclic testing break-out in step 608. Each specimen is broken-out, inspected, and the failure mode is documented. The test ends in step 610. If failure does not occur at an expected location in the connection, the specimen fails testing.

An Embodiment of Testing Scope for a T&C Connector

Figure 8:
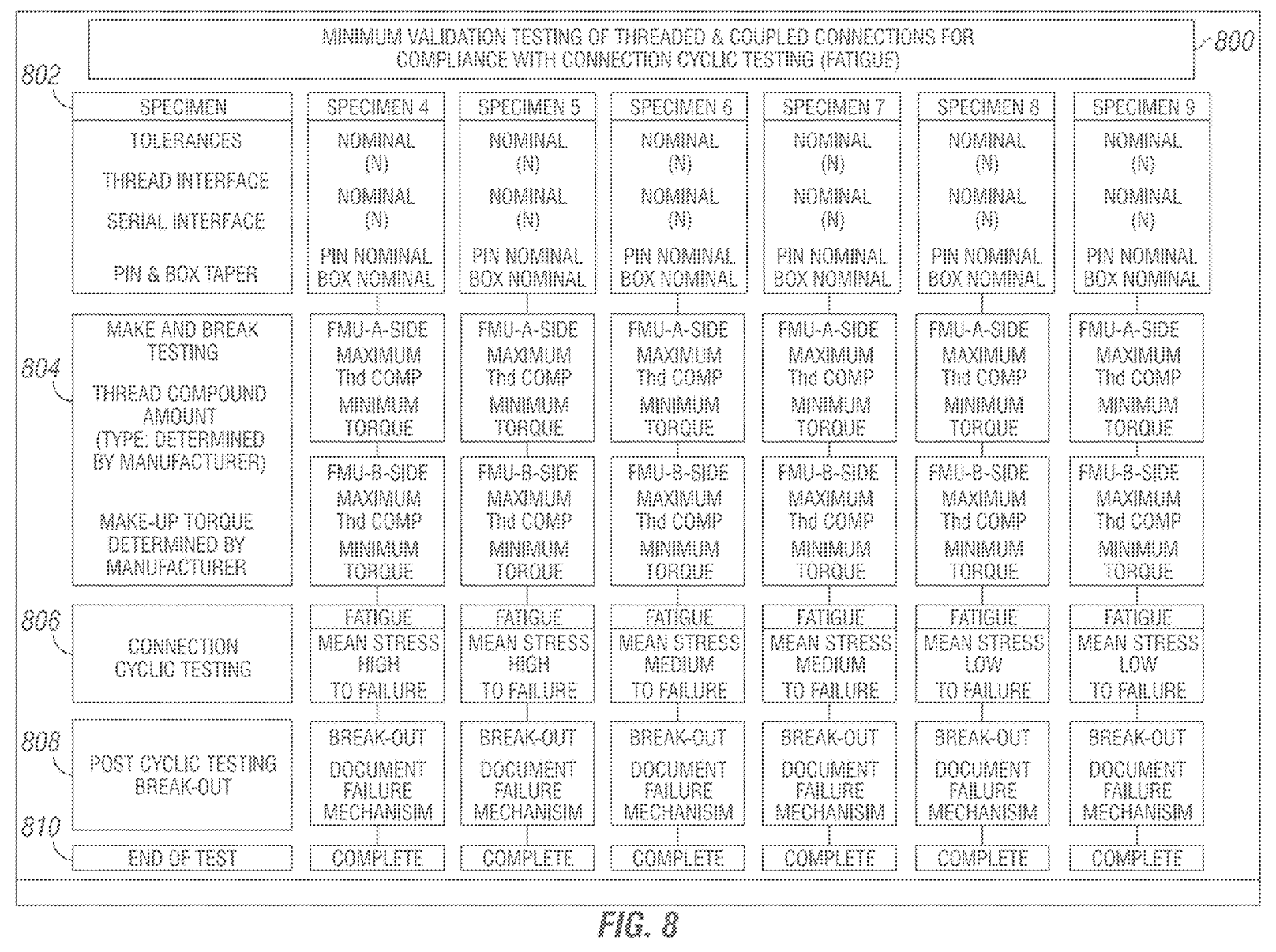

FIGS. 7 and 8 illustrate an example embodiment of T&C connector validation testing. The column on the left illustrates the general steps of the method, while the other columns illustrate a specific method comprising testing a variety of individual specimen. A specimen, as used in this example, is a T&C connector as shown in FIG. 2. In the testing steps, the two threaded ends of the coupling of the T&C connector are distinguished by referring to them as the A-side and the B-side as shown on FIG. 2.

FIG. 7 illustrates sealability testing. The general embodiment of minimum validation testing of T&C connections 700 starts with receiving one or more specimen that are manufactured to a certain tolerance in step 702. Although the tolerances for Specimen 1, Specimen 2, and Specimen 3 have differences, the connectors are generally of the same type. The minimum and maximum tolerances for these parts are provided from the manufacturer, which the manufacturer determined from initial configuration engineering drawings with appropriate tolerances provided. Tolerances such as extreme high, extreme low, etc. are determined by API 5C5 as percentages of the maximum and minimum tolerances provided by the manufacturer. Manufacturing these dimensions to the extreme tolerances can test worst-case conditions for sealability and for make and break performance.

The specimens (i.e. 1, 2, and 3) then undergo make and break testing in step 704. The make and break testing can include specifics on the type and amount of thread compound, which is defined by the manufacture. Specimen 1 undergoes 24 cycles of make-up and break-out (make and break for galling, MBG) with minimum thread compound and maximum torque on the A-side, followed by a final make up on the A-side with maximum thread compound and minimum torque. Side B of Specimen 1 then undergoes 24 cycles of make-up and break-out on the B-side with minimum thread compound and maximum torque followed by a final makeup on the B-side with maximum thread compound and minimum torque. The A-side Specimen 2 undergoes a final make up with maximum thread compound and minimum torque. The B-side of Specimen 2 then undergoes 3 make and break cycles with minimum thread compound and maximum torque, followed by a final make-up of the B-side with maximum thread compound and minimum torque. The A-side of Specimen 3 has a final make up with maximum thread compound and minimum torque. The B-side of Specimen 3 undergoes 3 cycles of make and break with minimum thread compound and maximum torque followed by a final make-up of the B-side with maximum thread compound and minimum torque. Thread compound and torque are defined by the manufacturer.

The specimens (i.e. 1, 2, and 3) then undergo a connection bake-out in step 706. In this step, the connector is heated to the max temperature for the design for about 12 hours.

Specimens (i.e. 2 and 3) then undergo connection seal and gasket testing in step 708. The tests are limited to maximum anticipated external pressure and to maximum anticipated compression. The testing parameters for this test are pulled from the VME curve that is generated by the manufacturer. Test series (TS) B is internal pressure with tension and compression. TS A is internal and external pressure with tension and compression. Quadrants are defined as seen in FIG. 3 with quadrant 1 being internal pressure and tension, quadrant 2 being internal pressure and compression, quadrant 3 being external pressure with compression and quadrant 4 being external pressure and tension. The superscript defines whether the test is done under ambient (a) or elevated (e) temperatures. The b subscript indicates if bending is added. With the lower value of the VME ellipse (see example of a VME curve in FIG. 3), the maximum anticipated external pressure, or the maximum anticipated compression defining the maximum used load, Specimen 2 first undergoes 80% of Q1 followed by 80% of Q2 at ambient temperature. Specimen 2 then undergoes testing with 95% of Q1, Q2, and Q1, in series, at ambient temperature. Specimen 2 then undergoes TS A at 95% of Q1, Q2, Q3, Q4, in series, at ambient temperature. Then Specimen 2 undergoes another round at 95% of Q4, Q3, Q2, Q1, in series, at ambient temperature. Specimen 3 also goes through TS-B and TS-A testing as notated in FIG. 5. All percent of quadrants maximums in the above tests may be limited to maximum anticipated external pressure and to maximum anticipated compression, in which case they may not follow the calculated load point of the curve in the VME curve.

Instead of undergoing seal testing, one or more specimen (specimen 1 in the example method of FIG. 7) undergoes external load testing in step 710. External load testing is done with an internal pressure equal to RWP and the manufacturer calculated bending values, based on 75% of max tension as defined by the manufacturer for 15 minutes. Specimen 1 then moves to combined loading with bending based on 50% of the max tension and then to combined loading with bending based on 25% of the max tension for 15 minutes each.

Following sealability testing and external load testing, Specimens 1-3 undergo post-sealability break out in step 712. In this step the B-side pin and box of each specimen are broken-out and the breakout torque of the post-sealability connector is compared to the torque measured in the make and break testing phase for the B-side of each specimen. The B-sides of Specimens 1-3 then undergo another final make-up.

Following post-sealability break-out, all specimens may undergo limit load testing in step 714. Specimen 1 undergoes testing at an internal pressure of RWP and tension is then applied to failure. Specimen 2 undergoes 50% tension and then internal pressure is applied to failure. Specimen 3 undergoes testing at an internal pressure of 300 psi and then tension is applied to failure. Failure is defined by loss of internal pressure or yielding of the connection. This ends sealability testing.

After testing is completed in step 716, the specimens are broken-out, inspected, and the failure mode is documented. If failure does not occur at an expected or acceptable location in the connection, the specimen fails testing.

FIG. 8 illustrates an example method for fatigue testing on T&C connectors. The general embodiment of minimum validation testing of T&C connections with connection cyclic testing 800 starts, in step 802, with receiving one or more specimens that are manufactured to a certain tolerance. The tolerances for Specimens 4-9 are the same, and the tolerances for sides A and B are both the same. Each specimen has nominal thread interference, nominal seal interference, and a nominal pin and box taper. Nominal is when the tolerance is the primary dimension that is given in the specification drawings by the manufacturer. All six specimens then undergo final make up in step 804 on the A-side and B-side with maximum thread compound and minimum torque.

The specimens then undergo connection cyclic testing in step 806. In this step a cyclic load machine is used to stress the connector at a specific stress state range until the connector fails. Failure is defined by loss of internal pressure or yielding of the connection.

After failure, each specimen undergoes a post cyclic testing break-out in step 808. Each specimen is broken-out, inspected, and the failure mode is documented. The test ends in step 810. If failure does not occur at an expected or acceptable location in the connection, the specimen fails testing.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

Incorporated herein by reference are API STD 17G, API STD 17G Annex E, and API RP 5C5.

What is claimed is:

1. A method for validation testing pipe connectors for oil and gas systems comprising:
   testing a first connector using the following steps, in order:
      making-up and breaking-out a first connector a first predetermined number of times;
      making-up the first connector;
      heating the first connector to a predetermined temperature creating a first baked out connector;

bending the first baked out connector at a stated capacity limit;
placing the first baked out connector under a first failure condition;
testing a second connector using the following steps, in order:
making-up and breaking-out the second connector a second predetermined number of times;
making-up the second connector;
heating the second connector to the predetermined temperature creating a second baked out connector;
testing the sealability of the second baked out connector under a first predetermined load condition; and
placing the second baked out connector under a second failure condition;
testing a third connector using the following steps, in order:
making-up and breaking-out the third connector a third predetermined number of times;
making-up the third connector;
heating the third connector to the predetermined temperature creating a third baked out connector;
testing the sealability of the third baked out connector under a second predetermined load condition; and
placing the third baked out connector under a third failure condition; and
testing a fourth connector using the following steps, in order:
making-up the fourth connector;
cyclically testing the fourth connector under a cyclically occurring fourth failure condition.

2. The method of claim 1, wherein the first predetermined number of times is about 27 and the second predetermined number of times is about 3.

3. The method of claim 2, wherein the first failure condition is internal pressure at rated working pressure and tension added to failure, the second failure condition is internal pressure to about 300 psi and tension to failure, the third failure condition is about 50% tension with internal pressure to failure, and the fourth failure condition is cyclic mean stress to failure.

4. The method of claim 1, wherein the first and second predetermined load conditions comprise one of tension, compression, internal pressure, and external pressure.

5. The method of claim 1, wherein failure occurs when the connector leaks.

6. The method of claim 1, wherein the predetermined temperature is about the maximum rated temperature for the first connector.

7. The method of claim 1, wherein the first connector's stated capacity limit is determined by a manufacturer of the connector.

8. The method of claim 1, wherein the first, second, third, and fourth connectors each comprise a first drill pipe comprising a pin and a second drill pipe comprising a box.

9. The method of claim 1, further comprising breaking-out and making-up the third baked out connector before placing the third baked out connector under a third failure condition and after placing the third baked out connector under the second predetermined load condition.

10. The method of claim 1, wherein the first connector, the second connector, the third connector, and the fourth connector are the same type of connector manufactured to different tolerances.

11. The method of claim 1, further comprising testing a fifth connector, a sixth connector, a seventh connector, an eighth connector, and a ninth connector using the following steps, in order:
making-up the fifth connector, the sixth connector, the seventh connector, the eighth connector, and the ninth connector;
cyclically testing the fifth connector under a cyclically occurring fifth failure condition;
cyclically testing the sixth connector under a cyclically occurring sixth failure condition;
cyclically testing the seventh connector under a cyclically occurring seventh failure condition;
cyclically testing the eighth connector under a cyclically occurring eighth failure condition; and,
cyclically testing the ninth connector under a cyclically occurring ninth failure condition.

12. The method of claim 11, wherein the fourth and fifth cyclically occurring failure conditions are high cyclic mean stress to failure, the sixth and seventh cyclically occurring failure conditions are medium cyclic mean stress to failure, and the eighth and ninth cyclically occurring failure conditions are low cyclic mean stress to failure.

13. The method of claim 11, further comprising breaking-out each connector after failure.

14. The method of claim 1, wherein the first, second, third, and fourth connectors each comprise a first pipe comprising a first pin, a second pipe comprising a second pin, and a coupling comprising a first box on one end of the coupling and a second box on an opposite end of the coupling.

15. The method of claim 14, wherein making-up and breaking-out the first connector the first predetermined number of times comprises making-up and breaking-out the first connector's first pin to the first connector's first box about 24 times, and making-up and breaking-out the first connector's second pin to the first connector's second box about 24 times; wherein making-up and breaking-out the second connector the second predetermined number of times comprises making-up and breaking-out the second connector's second pin to the second connectors second box about 3 times; and, wherein making-up and breakout-out the third connector the third predetermined number of times comprises making-up and breaking-out the third connector's second pin to the third connector's second box about 3 times.

16. The method of claim 14, further comprising breaking-out and making-up the first baked out connector, the second baked out connector and the third baked out connector before placing the connectors under the first, the second, and the third failure condition, respectively.

17. The method of claim 14, wherein making-up the fourth connector comprises making-up the connection between the fourth connector's first pin and the fourth connector's first box, and making-up the connection between the fourth connector's second pin and the fourth connector's second box.

18. The method of claim 1, wherein bending the first baked out connector comprises keeping an internal pressure of the first baked out connector at a rated working pressure and, in order,
1) bending the first baked out connector to rated bending capacity while applying about 75% rated tensile capacity,
2) bending the first baked out connector to rated bending capacity while applying about 50% rated tensile capacity, and 3) bending the first baked out connector to rated bending capacity while applying about 25% rated tensile capacity.

19. The method of claim 1, wherein the first connector comprises extreme high thread interference, extreme high seal interference, a fast pin, and a slow box; wherein the second connector comprises extreme high thread interference, extreme low seal interference, a slow pin and a fast box; wherein the third connector comprises low thread interference, low seal interference, a slow pin and a fast box; and, the fourth connector comprises nominal thread interference, nominal seal interference, a nominal pin and a nominal box.

\* \* \* \* \*